(12) United States Patent
Wagner et al.

(10) Patent No.: US 10,930,905 B2
(45) Date of Patent: Feb. 23, 2021

(54) BATTERY MODULE HAVING A PLURALITY OF BATTERY CELLS, METHOD FOR THE PRODUCTION THEREOF, AND BATTERY

(71) Applicant: Robert Bosch GmbH, Stuttgart (DE)

(72) Inventors: Christian Wagner, Kaiserslautern (DE); Daniel Bernd Greiner, Tuebingen (DE); Matthias Riedmann, Winnenden (DE); Peter Kohn, Stuttgart (DE); Robert Hafenbrak, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 16/074,030

(22) PCT Filed: Jan. 4, 2017

(86) PCT No.: PCT/EP2017/050119
§ 371 (c)(1),
(2) Date: Jul. 30, 2018

(87) PCT Pub. No.: WO2017/133856
PCT Pub. Date: Aug. 10, 2017

(65) Prior Publication Data
US 2019/0044113 A1 Feb. 7, 2019

(30) Foreign Application Priority Data
Feb. 3, 2016 (DE) .................. 10 2016 201 605.9

(51) Int. Cl.
*H01M 2/10* (2006.01)
*H01M 10/04* (2006.01)
*H01M 10/0525* (2010.01)

(52) U.S. Cl.
CPC ..... *H01M 2/1061* (2013.01); *H01M 10/0481* (2013.01); *H01M 10/0525* (2013.01)

(58) Field of Classification Search
CPC ............ H01M 2/1077; H01M 2/1061; H01M 10/0481; H01M 10/04; H01M 10/647; H01M 10/0525
See application file for complete search history.

(56) References Cited

U.S. PATENT DOCUMENTS

| | | | |
|---|---|---|---|
| 2004/0201366 A1* | 10/2004 | Kimoto | H01M 10/6557 320/150 |
| 2005/0158625 A1* | 7/2005 | Im | H01M 4/5825 429/231.1 |
| 2011/0293982 A1* | 12/2011 | Martz | H01M 10/613 429/120 |

FOREIGN PATENT DOCUMENTS

| | | |
|---|---|---|
| DE | 102013021331 A1 | 6/2015 |
| EP | 2453146 A1 | 5/2012 |

(Continued)

OTHER PUBLICATIONS

International Search Report with English translation and Written Opinion for Application No. PCT/EP2017/050119 dated Mar. 1, 2017 (11 pages).

*Primary Examiner* — Ula C Ruddock
*Assistant Examiner* — Matthew W Van Oudenaren
(74) *Attorney, Agent, or Firm* — Michael Best & Friedrich LLP

(57) ABSTRACT

The invention relates to a battery module having a plurality of battery cells, in particular lithium-ion battery cells, having a plurality of partitions (4), wherein a battery cell (2) is arranged between two partitions (4), and a spring element (6) is furthermore arranged between two partitions (4) adjacent to a battery cell (2), in particular a tension and/or compression spring element, which is arranged in a manner contacting and/or connected to the two partitions (4) such that a value of a deformation constant (12) of the spring (Continued)

element (6) determines a force transmitted by the two partitions (4) to the battery cell (2).

21 Claims, 1 Drawing Sheet

(56) References Cited

FOREIGN PATENT DOCUMENTS

| | | | |
|---|---|---|---|
| JP | 2000048867 | * | 2/2000 |
| JP | 2000048867 A | | 2/2000 |
| JP | 2007165698 A | | 6/2007 |
| JP | 2013045578 | * | 3/2013 |
| JP | 2013045578 A | | 3/2013 |
| JP | 2013545219 A | | 12/2013 |
| JP | 2014192094 A | | 10/2014 |
| WO | 2010016771 A1 | | 2/2010 |
| WO | 2015141631 A1 | | 9/2015 |

\* cited by examiner

BATTERY MODULE HAVING A PLURALITY OF BATTERY CELLS, METHOD FOR THE PRODUCTION THEREOF, AND BATTERY

BACKGROUND OF THE INVENTION

The invention takes as its starting-point a battery module having a plurality of battery cells and a method for production thereof, according to the generic parts of the independent claims. A battery with such a battery module is also a subject of the present invention.

It is known from the prior art that batteries—such as, in particular, lithium-ion batteries consist at least of one battery module or advantageously also of a plurality of battery modules. Furthermore, a battery module preferably exhibits, in addition, a plurality of individual battery cells which have been interconnected to form the battery module. In this case the individual battery cells may have been interconnected in series or in parallel.

Aging processes by reason of charging and discharging processes in the individual battery cells give rise to internal forces that have the consequence that the individual battery cells do not remain dimensionally constant during the operating period; rather, these processes, designated as swelling, deform the housing of the battery cells. These processes consequently require a design of the battery module that is able to absorb the internal forces arising by reason of aging processes and is able to limit the deformation of the housings of the individual battery cells. The application of a force to the individual battery cells or to the housings thereof, in order to limit the deformation, is generally designated as pressing. The rate of aging of the individual battery cells is determined, in particular, by the force expended for the pressing thereof, in which connection the rate of aging within the technically relevant operating range increases with increasing pressing force.

Moreover, the individual battery cells heat up during operation by reason of their internal resistance in the event of a flow of electric current. In this case the battery cells of a battery module have an inhomogeneous temperature distribution, battery cells in the middle of a battery module having a higher temperature by reason of the inferior possibility for dissipation of heat in comparison with battery cells located at the edge of a battery module. The rate of aging of the individual battery cells is also determined, in particular, by the temperature thereof, in which connection the rate of aging increases with increasing temperature. Since battery cells age more quickly with increasing temperature, a battery module with an inhomogeneous temperature distribution also has an inhomogeneous distribution of the rate of aging, which may have the consequence that the service life of the entire battery module is reduced, because the service life of a battery module is determined by the battery cell that ages most quickly.

It is known from the prior art, in particular from US 2014/0023893, that battery cells are arranged between two partitions, the individual partitions exhibiting elastic elements for determining the elasticity of an individual partition.

Furthermore, it is known from JP 2008/124033 to arrange elastic elements between two battery cells.

SUMMARY OF THE INVENTION

The battery module having a plurality of battery cells and the method for production thereof have the advantage that a force with which an individual battery cell is pressed can be adjusted via a deformation constant of a spring element. In particular, a desired pressing force can consequently be adjusted for each individual battery cell of the battery module. As a result, it is possible to influence the rate of aging of individual battery cells via the force expended for the pressing thereof.

In accordance with the invention, a battery module having a plurality of battery cells is made available, wherein the battery cells are, in particular, lithium-ion battery cells. The battery module exhibits a plurality of partitions, one battery cell being arranged between two partitions. In this case a spring element is furthermore arranged between two partitions adjacent to a battery cell. In particular, the spring element takes the form of a tension-spring element and/or compression-spring element. The spring element is arranged contacting and/or connected to the two partitions in such a way that a value of a deformation constant of the spring element determines a force transmitted from the two partitions to the battery cell.

Two partitions between which a battery cell is arranged are spaced from one another by a spacing. In this case the pressing force increases with which the battery cell arranged between the two partitions is pressed by the two partitions, in particular with increasing diminution of this spacing. The spring element in this case is arranged contacting and/or connected to the two partitions and between the latter, in which case for a reduction of the spacing of the two partitions a force that is dependent on the deformation constant is also required for a deformation of the spring element. Expressed in other words, this means that for a pressing of the battery cell arranged between the two partitions onto the two partitions in each instance a force pointing in the direction of the battery cell is applied which serves for a diminution of the spacing of the two partitions. In this case the forces that are based upon an expansion of the battery cell and also a restoring force of the spring element counteract the forces applied for the purpose of pressing. Since the restoring force of the spring element is dependent on the deformation constant thereof, the restoring force can be increased by an increase in the value of the deformation constant, as a result of which, given constant force applied to the two partitions, the spacing between the two partitions is enlarged and the pressing force is thereby reduced. As a result, in particular given constant forces applied to the two partitions, the spacing of the two partitions, and as a result also the pressing force ultimately acting on the battery cell, can be determined only by means of the value of the deformation constant.

It is an advantage if a first spring element is arranged between two partitions adjacent to a first battery cell and if a second spring element is arranged between two partitions adjacent to a second battery cell. In this case the first spring element and the second spring element preferably have different values of a deformation constant. As a result, it is possible that the first battery cell and the second battery cell are pressed with different pressing forces. Consequently, the rates of aging of the first battery cell and of the second battery cell can, for instance, be adapted in such a manner that said batteries have a similar aging-state over the operating period, particularly if the first battery cell and the second battery cell have different temperatures and consequently age at different rates, due to the temperature. Hence it is possible to compensate a different rate of aging, based upon different temperatures of the battery cells, by different pressing forces. In this case, battery cells having a higher temperature are pressed with a smaller pressing force than battery cells having a comparatively lower temperature.

Furthermore, as a result it is also possible to compensate already existing non-uniform pressing-states which, for instance, are conditioned by manufacture or arise by virtue of end plates or separating plates of the battery module having different elasticities.

It is expedient that the battery module exhibits two end plates, and that the plurality of battery cells and also, in particular, the plurality of partitions are arranged between the two end plates. In this case the two end plates are connected to one another by at least one bracing element in such a way that the two end plates transmit a force for pressing the plurality of battery cells. As a result, the force for pressing the individual battery cells of the battery module can be applied in straightforward manner via the two end plates, in which case the deformation constants of the spring elements arranged respectively between two partitions adjacent to a battery cell determine the force with which the battery cell is pressed that is arranged between the same two partitions as the spring element.

According to one aspect of the invention, the battery cells respectively form a battery-cell housing. In this case the battery-cell housing of at least one of the battery cells may include at least one partition. In particular, it is possible that each battery cell of the plurality of battery cells includes a partition. As a result, a simple structure of the battery module is possible.

It is expedient if two adjacent partitions are arranged in each instance with their largest lateral surfaces adjacent to one another in a longitudinal direction of the battery module and are spaced from one another by a spacing. In this case the battery cells which are respectively arranged between two partitions are preferably of prismatic design and, moreover, arranged side by side in the longitudinal direction of the battery module with their largest lateral surfaces adjacent to one another. As a result, it is possible that a reliable pressing of the battery cells is possible, since with their largest lateral surfaces the partitions contact the largest lateral surfaces of the battery cells and hence guarantee a secure transmission of the pressing forces for a pressing.

It is an advantage if the deformation constant is a spring constant, a modulus of elasticity, a bulk modulus of compression, or a viscosity. Consequently the deformation constant can be chosen as a material-specific quantity or determined by design of the spring element. The spring element in this case may have been designed to be purely elastic or may also include a plastically deformable portion.

The battery module preferably exhibits a plurality of spring elements which are respectively arranged between two partitions. In this case, several spring elements—such as, for instance, two spring elements—may also have been arranged between two partitions. The battery module further exhibits a first region and a second region in a longitudinal direction. In this case the battery module is designed in such a manner that the values of the deformation constants of the spring elements increase in the first region in the longitudinal direction of the battery module and/or decrease in the second region in the longitudinal direction of the battery module. As a result, in the first region in the longitudinal direction of the battery module the force with which the individual battery cells arranged side by side in the longitudinal direction of the battery module are pressed decreases. Furthermore, in the second region in the longitudinal direction of the battery module the force with which the individual battery cells arranged side by side in the longitudinal direction of the battery module are pressed increases. Since the rate of aging of the battery cells is dependent on the pressing force, an inhomogeneous distribution of the rate of aging, based upon the pressing, can consequently be generated. Furthermore, an existing inhomogeneous pressing can consequently also be compensated which, in particular, is conditioned by manufacture or based upon a different elasticity of separating plates and/or end plates of the battery module or which may also arise as a result of manufacturing tolerances of the individual battery cells. The battery module exhibits a first end and a second end in the longitudinal direction, in which connection a battery cell located at the outer edge of the battery module is described by the expression "the first end" or "the second end". Furthermore, in the longitudinal direction the battery module exhibits a central position which is located, in particular, precisely in the middle between the first end and the second end. The first region preferably comprises the region between the first end and the central position of the battery module, and the second region preferably comprises the region between the central position and the second end of the battery module.

The first region and the second region have expediently been adapted in such a way that during operation the temperature of the battery cells increases in the first region in the longitudinal direction and/or decreases in the second region in the longitudinal direction. As a result, a more homogeneous distribution of the aging-states of the individual battery cells can be made possible, because the battery cells having higher temperatures are pressed with a smaller force than battery cells with a comparatively lower temperature. Consequently, the inhomogeneous aging arising, in particular, by reason of differing possibilities for the removal of heat, which is caused by an inhomogeneous temperature distribution, can be compensated by means of an inhomogeneous pressing that is based upon differing deformation constants of the spring elements arranged between two partitions.

At this point, however, it should be noted that the pressing force with which a battery cell is pressed must not fall below a minimum pressing force, since otherwise the anode, the separator and the cathode might separate from one another, this being generally known by the term "delamination". A force falling below a minimum pressing force, leading to delamination, might undesirably intensify aging.

The invention further relates to a battery with a battery module just described.

In accordance with the invention, a method for producing a battery module just described is also made available. In this method, in a first step a temperature is determined for each battery cell that said battery cell will have during the operation of the battery module. This determination can be carried out both by experimental tests and by numerical simulations. In particular, this determination can also be carried out during the operation of the battery module. In particular in this connection, as a first approximation it may be postulated that battery cells in the middle of the battery module will have a higher temperature than battery cells at the edge of the battery module, in which connection FIG. 2 shows, in exemplary manner, a temperature progression of the battery cells over the longitudinal extent of the battery module.

In a second step, the spring elements in the battery module are now arranged in such a manner that one spring element has a higher value of a deformation constant in comparison with a preceding spring element in the longitudinal direction of the battery module if the determined temperature of a battery cell that is arranged between the same two partitions as the spring element is higher than the temperature of a battery cell that is arranged between the same two partitions as the preceding spring element.

Furthermore, in the second step the spring elements are arranged in the battery module in such a manner that one spring element has a lower value of a deformation constant in comparison with a preceding spring element in the longitudinal direction of the battery module if the determined temperature of a battery cell that is arranged between the same two partitions as the spring element is lower than the temperature of a battery cell that can between the same two partitions the preceding spring element.

As a result, the inhomogeneous aging of the battery cells that is based upon the inhomogeneous temperature distribution can be at least partly compensated by means of an inhomogeneous distribution of the pressing force.

BRIEF DESCRIPTION OF THE DRAWINGS

Embodiment examples of the invention are represented in the drawings and elucidated in more detail in the following description.

Shown are.

DETAILED DESCRIPTION

Figure 1:
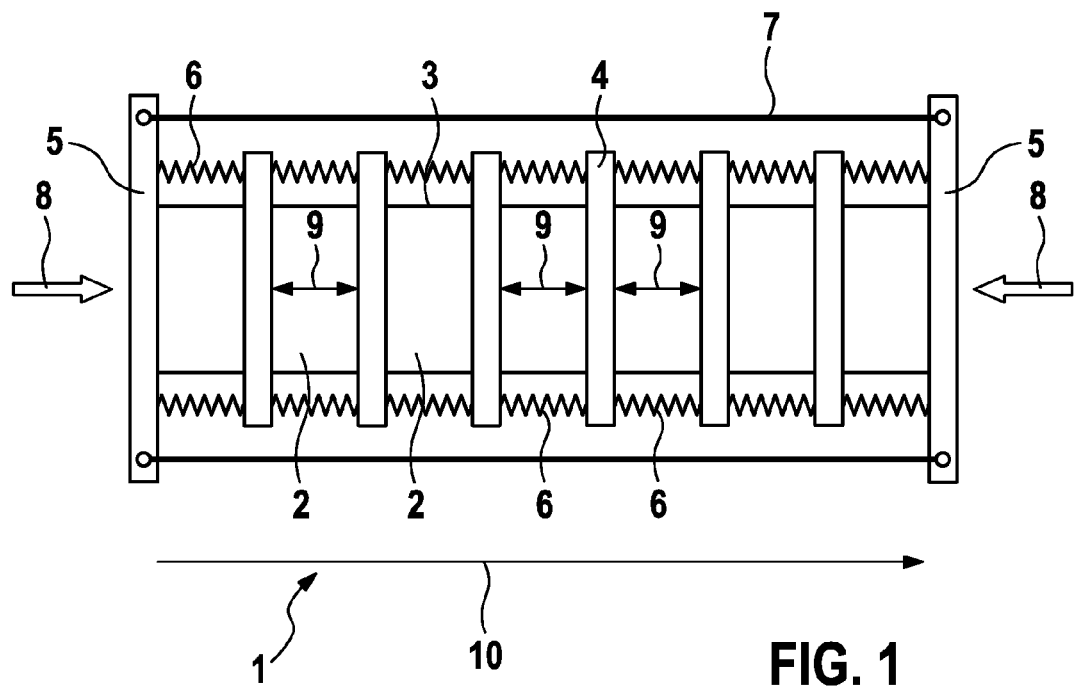
FIG. 1: schematically, an embodiment of a battery module according to the invention in a side view

FIG. 1 shows schematically an embodiment of a battery module 1 according to the invention in a side view. In this case the battery module 1 shown in FIG. 1 preferably exhibits a plurality of spring elements 6.

The battery module 1 exhibits a plurality of battery cells 2, said battery module 1 shown in FIG. 1 exhibiting, for instance, seven battery cells 2. A battery cell 2 preferably exhibits a battery-cell housing 3 in which the electrochemical components, not shown here, of the battery cell 2 are accommodated.

Moreover, it can be discerned from FIG. 1 that the battery module 1 further exhibits a plurality of partitions 4, said battery module 1 shown in FIG. 1 exhibiting, for instance, six partitions 4. In particular, it can be discerned from FIG. 1 that the number of battery cells 2 is greater by one than the number of partitions 4.

Furthermore, the battery module 1 exhibits two end plates 5, with the battery cells 2 and the partitions 4 being arranged between the two end plates 5. In particular, the battery cells 2, arranged between the two end plates 5, and the partitions 4 are arranged alternately, with, as can be discerned from FIG. 1, a partition 4 following a battery cell 2 in a longitudinal direction of the battery module 1, which is denoted by reference symbol 10.

As can further be discerned from FIG. 1, a battery cell 2 is arranged between two partitions 4 or between a partition 4 and one of the two end plates 5. Two partitions 4, between which a battery cell 2 is arranged, and one of the two end plates 5 and a partition 4, between which a battery cell 2 is arranged, are respectively spaced from one another by a spacing 9. The two partitions 4, or the one of the two end plates 5 and the partition 4, transmit the forces required for a pressing of the battery cell 2. Consequently, the smaller the spacing 9, the greater the pressing force.

Between two partitions 4 and/or between a partition 4 and an end plate 5 a spring element 6 is furthermore arranged. In particular, between two partitions 4 and/or between a partition 4 and an end plate 5 in each instance several—in particular two, as can be discerned from FIG. 1—spring elements 6 may have been arranged. A spring element 6 in this case has a deformation constant which describes a relationship between a deformation and the applied force. The spring element 6 in this case is arranged contacting and/or connected to the two partitions 4 or to the partition 4 and to one of the two end plates 5, between which the spring element 6 is arranged. In the embodiment example of a battery module 1 according to the invention that is shown schematically in FIG. 1, by the "deformation" of the spring element 6 a change of length in the longitudinal direction 10 of the battery module 1 is to be understood.

A restoring force of the spring element 6 attempts to counteract the deformation of the spring element 6, in particular the change of length in the longitudinal direction 10 of the battery module 1. Furthermore, the expansion processes based upon the aging processes of the battery cells 2 bring about forces that enlarge the spacing 9. The restoring force of the spring element 6 and the forces based upon the expansion processes are accordingly connected in parallel. Expressed in other words, this means that a spring element 6 is connected to a battery cell 2 in parallel. For a pressing of a battery cell 2, it is therefore necessary to counteract both the restoring force of the spring element 6 and the forces based upon expansion processes of the battery cells 2. By an increase of the deformation constant of the spring element 6, the total force counteracting the pressing can be increased, as a result of which the spacing 9 is also increased and hence the pressing force of a battery cell 2 decreases.

The two end plates 5 are connected to one another by a bracing element 7. As a result, by reason of the connection of the two end plates 5 a force counteracting the expansion, which is denoted by reference symbol 8, is applied by each of the two end plates 5 in the event of an expansion of the individual battery cells 2 during the operation of the battery module 1. Moreover, according to one idea of the invention it is also possible that the two end plates 5 are not connected to one another and the forces 8 counteracting the expansion are applied in a different way. The force 8 required for pressing the individual battery cells 2 is consequently applied by the two end plates 5. Since the spring elements 6 arranged between two partitions 4, which are connected in parallel to different battery cells 2, respectively preferably have different deformation constants, the spacings 9 between two partitions 4 are also ultimately different from one another. Since the spacing 9 determines the pressing force with which the individual battery cells 2 are pressed, the individual battery cells 2 are also pressed with different pressing forces by reason of different deformation constants of the spring elements 6. A spring element 6 having a higher value of a deformation constant is deformed less than a spring element 6 having a lower value of a deformation constant, as a result of which the two partitions 4 between which the spring elements 6 are respectively arranged have a different spacing 9.

Since, according to the embodiment example shown in FIG. 1, the two end plates 5 are braced to one another by a bracing element 7, the spacing between the two end plates 5 is preferably constant. Of course, it is also possible to brace the end plates 5 to one another in such a way that the spacing is at least partly variable. By reason of the, in particular, constant spacing between the two end plates 5, in the embodiment example shown in FIG. 1 the individual spacings 9 are not independent of one another. In principle, it holds that two partitions 4, between which a spring element 6 having a higher value of a deformation constant is arranged, have a larger spacing 9 than two partitions 4, between which a spring element 6 having a lower value of a deformation constant is arranged. By way of approximation, it can be assumed that the ratio of two deformation constants to one another corresponds to the ratio of the spacings 9 that are determined by the respective spring elements 6.

Figure 2:
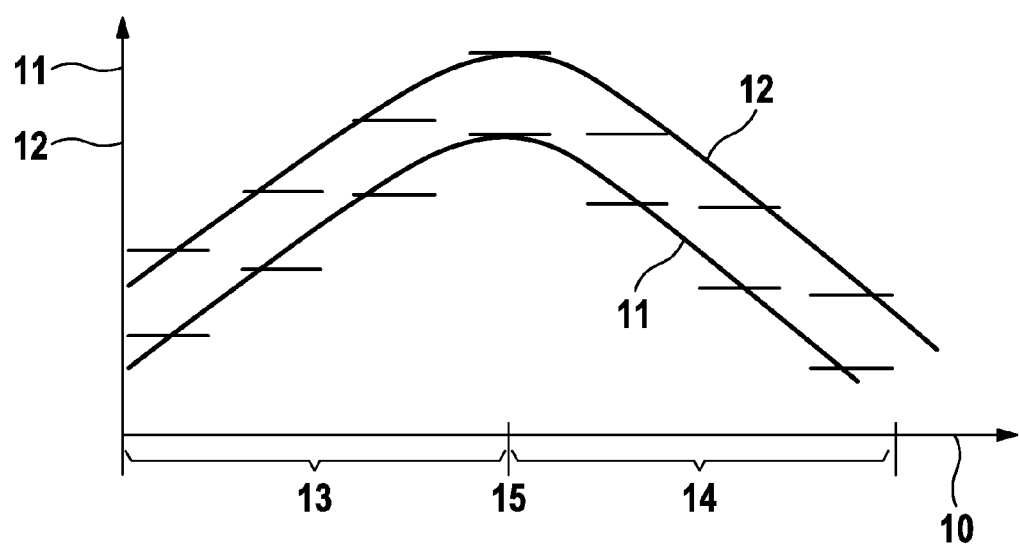
FIG. 2: in exemplary manner, a temperature progression of the battery cells during operation, and a progression of the values of the deformation constant of the spring elements over the longitudinal extent of the battery module.

FIG. 2 shows, in exemplary manner, a temperature progression of the battery cells 2 during operation and a progression of the values of the deformation constant of the spring elements 6 over the longitudinal extent 10 of the battery module 1.

For this purpose, both the progression of the temperature 11 and the progression of the values of the deformation constant 12 have been plotted in FIG. 2 over the longitudinal extent of the battery module 1, denoted by reference symbol 10.

In this figure it can be discerned that the temperature 11 of the individual battery cells 2 during the operation of the battery module 1 increases in a first region 13 in the longitudinal direction 10 and decreases in a second region 14 in the longitudinal direction 10.

Furthermore, it can be discerned from FIG. 2 that the values of the deformation constant 12 have been adapted in such a manner that they increase in the first region 13 in the longitudinal direction 10 and decrease in the second region 14 in the longitudinal direction 10.

In particular, the progression of the temperature 11 and/or the progression of the values of the deformation constant 12 have approximately a parabolic character, with the vertex of the parabola being situated in a central position 15 in the longitudinal direction 10 of the battery module 1.

In accordance with the invention, there is provision that the progression of the temperature 11 is determined prior to the operation of the battery module 1, and the progression of the values of the deformation constant 12 is adapted to the determined progression of the temperature 11 in such a way that an inhomogeneous rate of aging, based upon the temperature 11, is compensated by an inhomogeneous distribution of the pressing force that is based upon an inhomogeneous distribution of the values of the deformation constant 12. This may perfectly well also be a progression including several peaks and troughs with several first regions 13 and several second regions 14.

What is claimed is:

1. A battery module having a plurality of battery cells, and a plurality of partitions (4), wherein a battery cell (2) is arranged between two of the plurality of partitions (4), and wherein, between the two partitions (4), a spring element (6) is furthermore arranged contacting and/or connected to the two partitions (4) in such a way that a value of a deformation constant (12) of the spring element (6) determines a force transmitted from the two partitions (4) to the battery cell (2), and
   wherein the spring element (6) is a first spring element (6) and a second spring element (6) is arranged between another two of the plurality of partitions (4), characterized in that the first spring element (6) and the second spring element (6) have different values of a deformation constant (12).

2. The battery module as claimed in claim 1, wherein the battery module (1) comprises two end plates (5) and the plurality of battery cells (2) are arranged between the two end plates (5), characterized in that the two end plates (5) are connected to one another by at least one bracing element (7) in such a way that the two end plates (5) transmit a force (8) for pressing the plurality of battery cells (2).

3. The battery module as claimed in claim 1, wherein the battery cells (2) respectively form a battery-cell housing (3), characterized in that the battery-cell housing (3) of at least one battery cell (2) includes at least one partition (4).

4. The battery module as claimed in claim 1, wherein two adjacent partitions (4) are arranged in each instance with their largest lateral surfaces adjacent to one another in a longitudinal direction (10) of the battery module (1) and are spaced from one another by a spacing (9), wherein the battery cells (2) are each of prismatic design and are arranged side by side in the longitudinal direction (10) of the battery module (1) with their largest lateral surfaces adjacent to one another.

5. The battery module as claimed in claim 1, characterized in that the deformation constant (12) is a spring constant, a modulus of elasticity, a bulk modulus of compression, or a viscosity.

6. A battery module having first and second battery cells, first and second spring elements (6), and a plurality of partitions (4),
   wherein the first battery cell and the first spring element are located in a first region in a longitudinal direction (10), the first region being defined between two of the plurality of partitions (4), the first spring element (6) contacting and/or being connected to the two partitions (4) defining the first region in such a way that a value of a deformation constant (12) of the first spring element (6) determines a force transmitted to the first battery cell by the two partitions (4) defining the first region,
   wherein the second battery cell and the second spring element are located in a second region in a longitudinal direction (10), the second region being defined between another two of the plurality of partitions (4), the another two of the plurality of partitions including at least one of the plurality of partitions that does not define the first region, the second spring element (6) contacting and/or being connected to the two partitions (4) defining the second region in such a way that a value of a deformation constant (12) of the second spring element (6) determines a force transmitted to the second battery cell by the two partitions (4) defining the second region, and
   wherein the value of the deformation constant (12) of the first spring element (6) is higher than or lower than the value of a deformation constant (12) of the second spring element (6).

7. The battery module as claimed in claim 6, characterized in that the first region (13) and the second region (14) are configured in such a way that during operation the temperature (11) of the first and second battery cells (2) increases in the first region (13) in the longitudinal direction (10) and/or decreases in the second region (14) in the longitudinal direction (10).

8. A battery with a battery module as claimed in claim 1.

9. A method for producing a battery module as claimed in claim 6, wherein
   in a first step, a temperature (11) of the first and second battery cells (2) for the operation of the battery module (1) is determined, and
   in a second step, spring elements (6) are arranged in the battery module (1) in such a manner that the first spring element (6) has a higher value of a deformation constant (12) in comparison with the second spring element (6) if the determined temperature (11) of the first battery cell (2) is higher than the temperature (11) of the second battery cell (2).

10. A method for producing a battery module as claimed in claim 6, wherein
in a first step, a temperature (11) of the first and second battery cells (2) for the operation of the battery module (1) is determined, and
in a second step, spring elements (6) are arranged in the battery module (1) in such a manner that the first spring element (6) has a lower value of a deformation constant (12) in comparison with the second spring element (6) if the determined temperature of the first battery cell is lower than the temperature (11) of the second battery cell (2).

11. The battery module according to claim 1, wherein the spring element (6) is a tension-spring element and/or compression-spring element.

12. The battery module as claimed in claim 1, characterized in that the deformation constant (12) is a spring constant.

13. The battery module as claimed in claim 1, characterized in that the deformation constant (12) is a modulus of elasticity.

14. The battery module as claimed in claim 1, characterized in that the deformation constant (12) is a bulk modulus of compression.

15. The battery module as claimed in claim 1, characterized in that the deformation constant (12) is a viscosity.

16. The battery module as claimed in claim 1, wherein the battery cell (2) contacts the two of the plurality of partitions (4).

17. The battery module as claimed in claim 1, wherein the second spring element (6) is arranged nearer to a center of the plurality of partitions (4) than the first spring element (6), and wherein the value of the deformation constant (12) of the second spring element (6) is higher than the value of the deformation constant of the first spring element (6).

18. The battery module as claimed in claim 1, wherein a battery cell (2) is arranged contacting and/or connected to the two partitions (4), and wherein the battery cell (2) is separate from the spring element (6).

19. The battery module as claimed in claim 1, wherein the plurality of partitions (4) are movable toward and away from each other.

20. The battery module as claimed in claim 1, wherein a third spring element (6) is arranged contacting and/or connected to the two partitions (4) in such a way that a value of the deformation constant (12) of the second spring element (6) also determines the force transmitted from the two partitions (4) to the battery cell (2).

21. A battery module having a plurality of battery cells, and a plurality of partitions (4), wherein a battery cell (2) is arranged between two of the plurality of partitions (4) that are movable toward and away from each other, and wherein, between the two partitions (4), a first spring element (6) is furthermore arranged contacting and/or connected to the two partitions (4) in such a way that a value of a spring constant (12) of the first spring element (6) determines a force transmitted from the two partitions (4) to the battery cell (2), wherein the first spring element (6) is separate from the battery cell (2), and
wherein a second spring element (6) is arranged between another two of the plurality of partitions (4), characterized in that the first spring element (6) and the second spring element (6) have different values of a deformation constant (12).

\* \* \* \* \*